US011451470B2

(12) United States Patent
Power et al.

(10) Patent No.: US 11,451,470 B2
(45) Date of Patent: Sep. 20, 2022

(54) SYSTEMS AND METHODS FOR DATA SERVICE REQUEST CLASSIFICATION AND ROUTING

(71) Applicant: Intel Corporation, Santa Clara, CA (US)

(72) Inventors: Damien Power, Co. Clare (IE); Chris MacNamara, Limerick (IE); Marco Varlese, Raheny (IE)

(73) Assignee: INTEL CORPORATION, Santa Clara, CA (US)

( * ) Notice: Subject to any disclaimer, the term of this patent is extended or adjusted under 35 U.S.C. 154(b) by 312 days.

(21) Appl. No.: 16/755,554

(22) PCT Filed: Aug. 5, 2016

(86) PCT No.: PCT/US2016/045882
§ 371 (c)(1),
(2) Date: Apr. 10, 2020

(87) PCT Pub. No.: WO2018/026380
PCT Pub. Date: Feb. 8, 2018

(65) Prior Publication Data
US 2020/0287821 A1 Sep. 10, 2020

(51) Int. Cl.
*H04L 12/725* (2013.01)
*H04L 12/24* (2006.01)
(Continued)

(52) U.S. Cl.
CPC ........ *H04L 45/304* (2013.01); *H04L 12/4625* (2013.01); *H04L 41/0806* (2013.01);
(Continued)

(58) Field of Classification Search
CPC ............... H04L 45/304; H04L 12/4625; H04L 41/0806; H04L 41/0893; H04L 41/0896; H04L 61/2007; H04L 67/327; H04L 69/16
(Continued)

(56) References Cited

U.S. PATENT DOCUMENTS 7,788,386 B2 * 8/2010 Svensson ............ H04L 12/1859
709/229
8,953,453 B1 * 2/2015 Xiao ..................... H04L 67/327
370/235.1
(Continued)

FOREIGN PATENT DOCUMENTS

CN 105847330 A * 8/2016

OTHER PUBLICATIONS

P. Calhoun, RFC 3588: Diameter Base Protocol, Sep. 2003, p. 7 (Year: 2003).*
(Continued)

Primary Examiner — Schquita D Goodwin
(74) Attorney, Agent, or Firm — Hanley, Flight & Zimmerman, LLC

(57) ABSTRACT

A Service Routing Agent and methods are disclosed that classify and route data service requests. One embodiment includes a control circuit and at least one orchestrator, processor, and service handler circuit. The control circuit performs a process to: receive a configuration of at least one service handler circuit, initialize a list of service handler circuits and associated applications, program the at least one processor to listen for data service requests associated with the application, receive a data service request, and determine whether a service handler circuit associated with the application has been activated; when the service handler circuit has been activated, forwards the data service request to the (Continued)

service handler circuit, and when the service handler circuit has not been activated, request that the service handler circuit be activated, and then forwards the data service request to the service handler circuit. The Service Routing Agent reports updated traffic statistics.

18 Claims, 11 Drawing Sheets

(51) Int. Cl.
| | |
|---|---|
| *H04L 12/46* | (2006.01) |
| *H04L 29/08* | (2006.01) |
| *H04L 29/12* | (2006.01) |
| *H04L 29/06* | (2006.01) |
| *H04L 45/302* | (2022.01) |
| *H04L 41/0806* | (2022.01) |
| *H04L 41/0893* | (2022.01) |
| *H04L 41/0896* | (2022.01) |
| *H04L 69/16* | (2022.01) |
| *H04L 61/5007* | (2022.01) |
| *H04L 67/63* | (2022.01) |

(52) U.S. Cl.
CPC ...... *H04L 41/0893* (2013.01); *H04L 41/0896* (2013.01); *H04L 61/5007* (2022.05); *H04L 67/63* (2022.05); *H04L 69/16* (2013.01)

(58) Field of Classification Search
USPC .......................................................... 370/329
See application file for complete search history.

(56) References Cited

U.S. PATENT DOCUMENTS

| | | | |
|---|---|---|---|
| 10,877,669 | B1* | 12/2020 | Sivasubramanian ........................ H04L 41/0896 |
| 2009/0077618 | A1* | 3/2009 | Pearce .................... H04L 63/20 726/1 |
| 2010/0169490 | A1* | 7/2010 | McNair ................. G06F 9/5083 709/226 |
| 2011/0238825 | A1 | 9/2011 | Maffione et al. |
| 2012/0254349 | A1* | 10/2012 | Quigley .................. H04L 67/20 709/217 |
| 2014/0074973 | A1 | 3/2014 | Kumar et al. |
| 2014/0317261 | A1 | 10/2014 | Shatzkamer et al. |
| 2015/0172134 | A1* | 6/2015 | Yanacek ............... G06F 15/173 709/223 |
| 2015/0319078 | A1 | 11/2015 | Lee et al. |
| 2016/0044118 | A1 | 2/2016 | Huang et al. |
| 2016/0294967 | A1* | 10/2016 | Reveron ............. H04L 67/2809 |
| 2016/0337193 | A1* | 11/2016 | Rao ..................... H04L 41/0806 |
| 2016/0373303 | A1* | 12/2016 | Vedam ..................... H04L 43/10 |
| 2017/0070892 | A1* | 3/2017 | Song ..................... H04W 48/20 |
| 2017/0102757 | A1* | 4/2017 | Kang ..................... G06F 9/5094 |
| 2017/0237686 | A1* | 8/2017 | Wang .................... H04L 45/745 709/219 |
| 2017/0255876 | A1* | 9/2017 | Malatesha ................ G06N 5/04 |
| 2017/0289307 | A1* | 10/2017 | Thompson .............. G06F 9/505 |

OTHER PUBLICATIONS

International Searching Authority, "Written Opinion and Search Report," issued in connection with application No. PCT/US2016/045882, dated Apr. 27, 2017, 12 pages.
International Searching Authority, "International Preliminary Report on Patentability," issued in connection with application No. PCT/US2016/045882, dated Feb. 5, 2019, 8 pages.

* cited by examiner

SYSTEMS AND METHODS FOR DATA SERVICE REQUEST CLASSIFICATION AND ROUTING

TECHNICAL FIELD

Embodiments described herein generally relate to network traffic management and distribution. In particular, embodiments described generally relate to systems and methods for data service request classification and routing.

BACKGROUND INFORMATION

Authentication, Authorization, and Accounting (AAA) protocols have been defined and provide a framework for applications such as network access or IP mobility in both local and roaming situations. The International Engineering Task Force (IETF) has promulgated AAA protocols such as TACACS (RFC 1492), Radius (RFC 2865), and Diameter (RFC 3588, RFC4006, RFC 6733), to name a few. AAA frameworks have been useful in applications relating to content-based billing, Voice over IP (VoIP), videoconferencing, instant messaging, email, packet-switched communications, and passing general messages and delivering attribute-value pairs (AVPs) necessary for applications.

The increase Diameter signaling resulting from the increased number of devices, including mobile devices and handsets, as well as increases in types of usage, such as by Internet of Things, social networking, video streaming, to name a few, has led to a veritable traffic storm. By some estimates, device traffic has been forecasted to triple mobile data growth. AAA-based application servers are challenged to respond to an expanding volume of client data service requests and the associated traffic.

BRIEF DESCRIPTION OF THE DRAWINGS

The various advantages of the embodiments disclosed herein will become apparent to one skilled in the art by reading the following specification and appended claims, and by referencing the drawings, in which:

DETAILED DESCRIPTION

Figure 1:
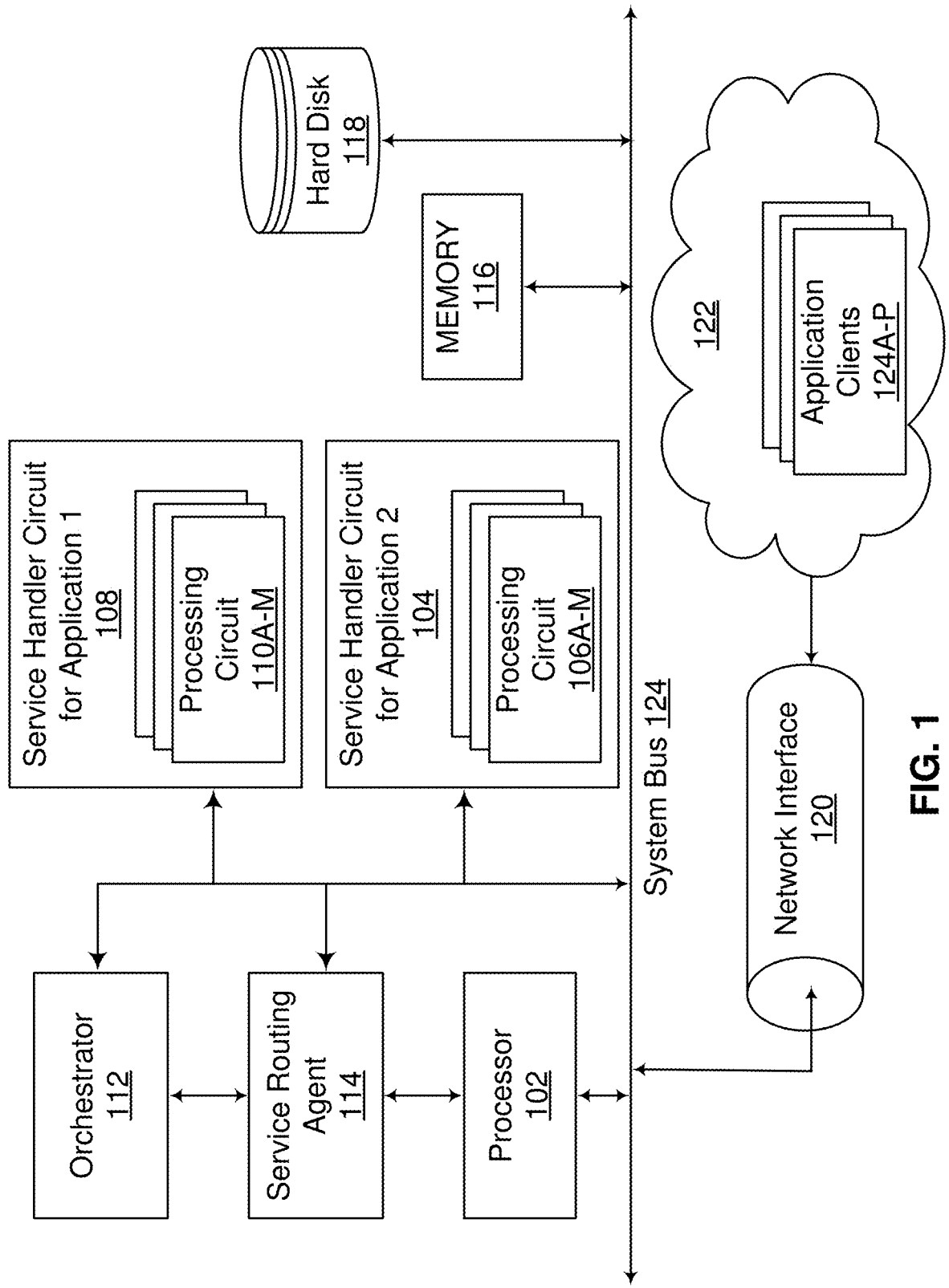
FIG. 1 is a block diagram illustrating an embodiment of a data service request classification and routing system.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

With the expansion of the number of networked devices, new usages, and new applications has come an expansion of associated traffic. The increasing number of Services, including over the top (OTT) services (e.g. Facebook, Twitter, Snapchat), online gaming services, video streaming services, the increasing mobile subscriber base impacts networks in way such as a higher demand of busy hour traffic, varying rating and policy conditions varying types of services and devices impacts poorly designed services that are being monitored for revenue may trigger high transaction rates, some services having higher traffic than others. Traffic spikes and high-bandwidth applications can challenge datacenters. Application servers relying on general purpose processors, and even datacenters having multiple general purpose processor are often unable to handle the traffic bandwidth to datacenters that in some cases house servers that support many different applications.

Some embodiments disclosed herein describe a system to classify and route incoming data service requests to a corresponding service handler with minimal intervening processes, yielding a result with low latency.

In some embodiments, a network operator may configure the network to prioritize a defined set of services characterized by a class of device or service type. For example, revenue-generating services and/or services requiring low latency can be prioritized by assigning them to their own service handler circuits. For example, in some cases, low-priority Internet of Things (IoT) devices may cause a storm on the network which would impact revenue generating services and services requiring a low latency if they were to share the same service handler.

In some embodiments, for example in a Fog computing (FC)network, the orchestrator is aware of the type of services entering/incoming to the network and may choose to configure the network with service handlers at the network edge, guarding against loading a network with centrally location service handlers.

In some embodiments, a system is disclosed that is capable of scaling out or scaling in processing resources to handle increases and decreases in data service request traffic. In some embodiments, when the system is receiving a high volume of data service requests, the orchestrator may scale-out or scale-in capacity of service handler circuits based on the service.

In some embodiments, received data service requests are segregated, being classified according to their associated application. Segregating the data service requests lowers the chances that one application can compromise the performance of other applications, and can help yield a result with low latency.

In some embodiments disclosed herein, data service requests are processed by service handler circuits dedicated to applications associated with data service requests. In some embodiments, the service handler circuits include pools of multiple processing circuits to process data service requests. Also, in some embodiments, an orchestrator, in response to the reported traffic statistics, can scale out or scale in a service handler circuit, as necessary to meet the traffic demands.

Some embodiments disclosed herein may contribute to achieving low-latency and high throughput goals, such as those of emerging 5G networks and cloud computing. Some embodiments disclosed herein may support servicing large numbers of user, Internet of Things (IoT) devices, and Machine to Machine (M2M) devices. Some embodiments disclosed herein may be utilized with technologies such as Software Defined Networking (SDN), Network Functions Virtualization (NFV), Mobile Edge Computing (MEC) and Fog Computing (FC), to try to achieve the requirements of cloud computing.

In some embodiments, for example for use in 5G networks, service-based message discrimination allows the operator to configure the network on a per-service basis. This form of network slicing can be distributed to network edge and implemented by the orchestrator. The orchestrator in such embodiments may apply weighted configurations to Credit Control Requests (CCR) messages, allowing critical, revenue-generating, low latency or time or absolute quota based access to the service. Performing this at the network edge via placement of functionality on edge computing blades may be used as part of a flexibly on demand service based network.

Some embodiments disclosed herein may be used to support real-time Policy and Charging Rules Function (PCRF) services that may play part in billing, rating, charging, subscriber database, and Voice Over IP services, to name a few. Some embodiments, for example, may be advantageous to achieving low-latency responses to Credit Control Requests (CCRs), such as an initial request (CCR-I), an update request (CCR-U), and a termination request (CCR-T).

FIG. 1 is a block diagram illustrating an embodiment of a data service request classification and routing system. As shown, the system includes processor 102, which is coupled to system bus 124, memory 116, hard disk 118, and network interface 120, through which data service requests are received from the network 122 and application clients 124A-P.

In some embodiments, data service requests include requests relating to authorization, authentication, and accounting. In some embodiments, data service requests are used to exchange application-specific attribute-value pairs between an application client and server. In some embodiments, data service requests are received by processor 102, and are classified and routed to at least one of service handler circuits 104 and 108. As illustrated, service handler circuits 104 and 108 are dedicated to processing data service requests for Applications 1 and 2, respectively. In some embodiments, service handler circuits 104 and 108 comprise a plurality of processing circuits, 106A-M and 110A-M, respectively. In some embodiments, each of the plurality of processing circuits can be activated or deactivated, depending on the volume of data service requests. In some embodiments, activation and deactivation of each of the processing circuits in service handler circuits 104 and 108 is controlled by orchestrator 112.

In some embodiments orchestrator 112 is to manage configuring, activating or deactivating, and horizontally scaling in or scaling out the processing circuits of service handler circuits 104 and 108. In some embodiments, orchestrator 112 communicates activation and deactivation commands to scale out or scale in, respectively, the number of activated processing circuits 106A-M and 110A-M of service handler circuits 104 and 108, respectively. In some embodiments, orchestrator 112 initially configures service handler circuits 104 and 108 according to a default configuration, then analyzes data service traffic statistics to determine whether to scale out or scale in the number of activated processing circuits.

In some embodiments, orchestrator 112 provides configuration information to Service Routing Agent 114, including information on which service handler circuits 104 and 108 are activated for which applications, and how to communicate with them. In some embodiments, Service Routing Agent monitors data service request traffic and reports data service traffic statistics to orchestrator 112.

In an embodiment, orchestrator 112 is a physical processor or processor core that is to execute computer instructions to perform the functionality of embodiments described herein. In an embodiment, orchestrator 112 is a virtual processor. In some embodiments, the computer instructions may be microcode or firmware defined in the processor's instruction set architecture. In an embodiment, orchestrator 112 is implemented as a routine including instructions to be executed by a processor to implement the functionality of embodiments disclosed herein.

FIG. 1 further includes Service Routing Agent 114, which in some embodiments is programmed by orchestrator 112 to know which service handler circuits are available to service application data service requests. Service Routing Agent is further to maintain a listing of applications for which service handler circuits 104 and 108 are to process data service requests. In some embodiments, Service Routing Agent in turn is to program processor 102 to listen for data service requests, to classify them, and to route them to the appropriate service handler circuit. In an embodiment, processor 102 classifies received data service requests according to their associated application. In an embodiment, processor 102 conducts a load balancing to select among available service handler circuits.

In the illustrated embodiment, Service Routing Agent 114 is a physical processor or processor core that is to execute computer instructions to perform the functionality of embodiments described herein. In some embodiments, the computer instructions may be microcode or firmware defined in the processor's instruction set architecture.

In some embodiments, Service Routing Agent 114 is implemented as a virtual machine. In some embodiments, Service Routing Agent 114 is a virtual machine that serves as part of a virtual switch (vSwitch) to connect other virtual machines, including orchestrator 112 and service handler circuits 104 and 108 implemented as virtual machines.

In some embodiments, Service Routing Agent 114 may be implemented as a software routine, including instructions to be executed by a processor to implement the functionality of embodiments disclosed herein. Service Routing Agent 114, when implemented as a software routine, may be executed by processor 102. In alternate embodiments, Service Routing Agent 114 may be implemented as a software routine executed on a different processor.

The system illustrated in FIG. 1 also includes network interface 120 which couples the system to cloud 122 containing application clients 124A-P. Furthermore, the system also includes memory 116 and hard disk 118. In some embodiments, Service Routing Agent 114 is implemented as a software routine consisting of computer-executable instructions stored in memory 116. In some embodiments, Service Routing Agent 114 is implemented as a software routine consisting of computer-executable instructions stored in hard disc 118. In some embodiments implementing Service Routing Agent 114 as a software routine, computer-executable instructions corresponding to Service Routing Agent 114 are to be loaded from memory 116 or hard disk 118, and executed by a processor.

The number of components illustrated in FIG. 1 is not to limit the embodiments disclosed herein. Although only two service handler circuits, 104 and 108, are shown, in some embodiments, the number of service handler circuits can be higher, without limitation. Similarly, although only processing circuits A-M are shown, in some embodiments, the number of processing circuits can be larger, without limitation. Similarly, although only one each of processor 102, Service Routing Agent 114, and orchestrator 112 is shown, in some embodiments, their number can be larger, without limitation.

In some embodiments, service handler circuits 104 and 108 include a pool of processing circuits, each processing circuit to be individually activated. In some embodiments, orchestrator 112 activates processing circuits according to a default configuration. The number of activated processing circuits can be scaled out or scaled in by orchestrator 112 to attempt to match data service request traffic. In some embodiments, at least one additional processing circuit is activated when the traffic volume is higher than a high threshold. In some embodiments, at least one of the processing circuits is deactivated when the traffic volume is lower than a low threshold. A processing circuit may be deactivated for purposes of energy efficiency or for returning a resource to a pool of available resources for re-use in some embodiments, orchestrator 112 is to monitor traffic statistics received from Service Routing Agent 114 and control scaling in and scaling out of the processing circuits to attempt to accommodate the traffic volume. The scaling may be applied in some cases per service or based on class of device.

In an embodiment, at least one of Service Handler Circuits 104 and 108 is a physical processor or processor core that is to execute computer instructions to perform the functionality of embodiments described herein. In an embodiment, at least one of Service Handler Circuits 104 and 108 is a virtual processor. In some embodiments, the computer instructions may be microcode or firmware defined in the processor's instruction set architecture. In an embodiment, at least one of Service Handler Circuits 104 and 108 is implemented as a routine including instructions to be executed by a processor to implement the functionality of embodiments disclosed herein.

In some embodiments, two or more of service handler circuits 104 and 108, orchestrator 112, and Service Routing Agent 114 may be implemented as different software routines to be executed by a single processor. In some embodiments, two or more of service handler circuits 104 and 108, orchestrator 112, and Service Routing Agent 114 may be implemented as different software routines to be executed by multiple processors or processor cores.

Figure 2:
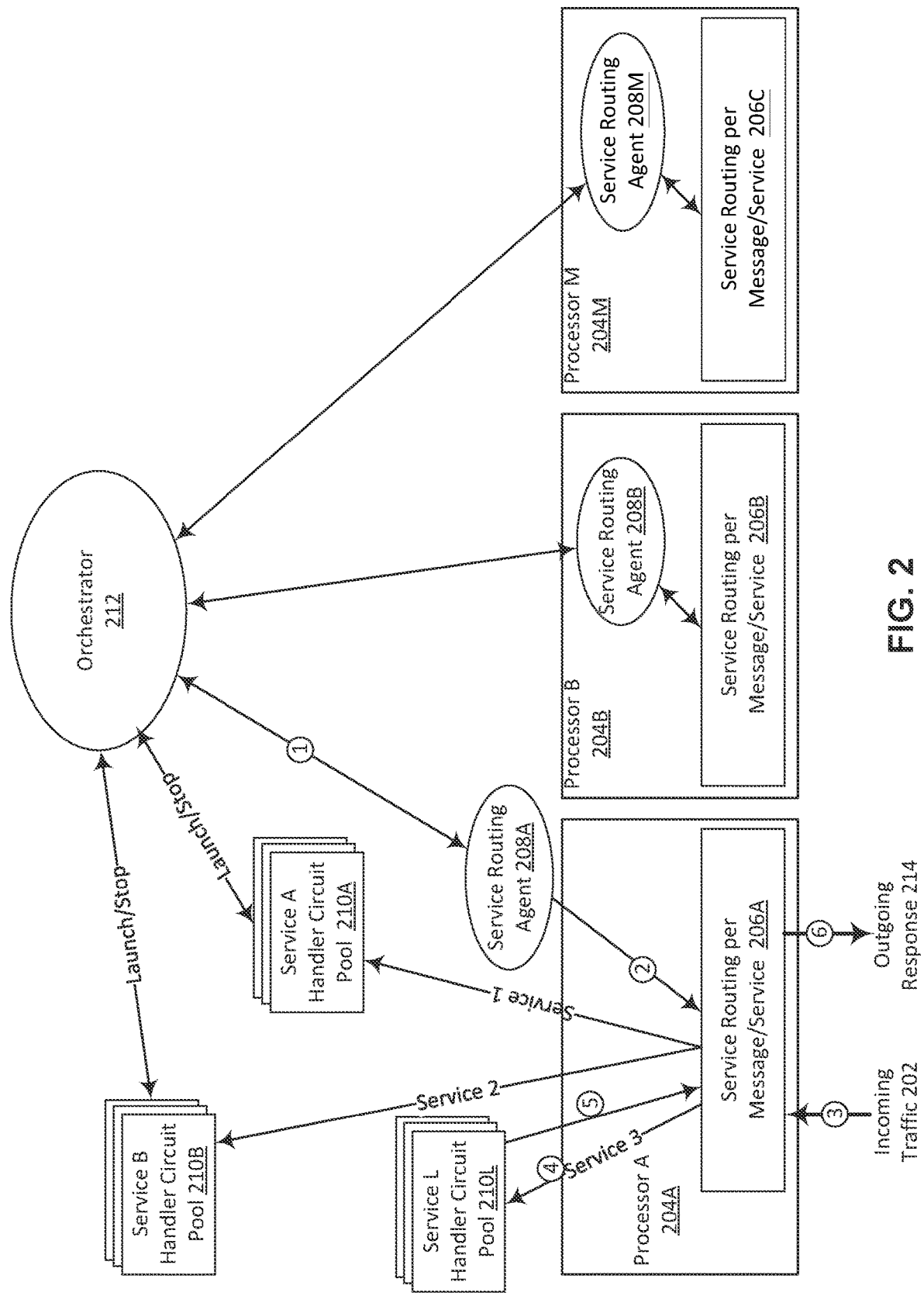
FIG. 2 is a block flow diagram illustrating an embodiment of messaging pathways used in methods and systems to classify and route data service requests.

FIG. 2 is a block flow diagram illustrating an embodiment of messaging pathways used to classify and route data service requests. In some embodiments, Service Routing Agent 208A, B, and C are configured by orchestrator 212 according to a default configuration, the configuration identifying activated service handler circuits 210A-L, and their associated applications. In some embodiments, orchestrator 212 also provides Service Routing Agents 208A, B, and C with instructions on how to communicate with the activated service handler circuits, for example by providing an Internet Protocol (IP) address of the service handler circuit. In some embodiments, Service Routing Agent 208A then configures processor A 204A to listen for data service requests received for a particular application, and also programs processor A 204A with the appropriate service handler circuit 210A-L to which to route the request.

In some embodiments, processor A 204A is implemented as a hardware circuit. In some embodiments, processor A 204A is implemented as hardware to perform as an intelligent network interface card (NIC) programmed with routing rules. In other embodiments, processor A 204A is implemented as a software routine, consisting of machine-executable instructions to be executed on a processor. In some embodiments, processor A 204A is implemented as a virtual machine connected to other virtual machines with a virtual switch (vSwitch).

As shown, incoming traffic 202 is received by processor A 204A. In particular, incoming traffic 202 is received by service 206A, which provides routing on a per message and per service basis. As illustrated, service 206A, having been programmed to know to which of service handler circuits 210A-L to route the request, forwards the received data service requests to one of service handler circuits 210A-L. In some embodiments, after processing the data service request, the one of service handler circuits 210A-L that received the request provides an outgoing response 214 to the data service request to processor A 204A.

As illustrated, service handler circuits 210A-L include a pool of multiple processing circuits. In some embodiments, one or more of the processing circuits of service handler circuits 210A-L is stateless, meaning that routing can be done at a message level and data service requests can go to any one of the processing circuits in the available pool of processing circuits. In other embodiments, one or more of the processing circuits of service handler circuits 210A-L is stateful, meaning that when a session starts, all subsequent requests have to go to the same service handler instance.

FIG. 2 illustrates an example of a numbered flow of a data service request classification and routing according to an embodiment. As illustrated, orchestrator 212 configures Service Routing Agent 208A according to a default configuration over the path labeled as "1." Service Routing agent 208A in turn programs processor A 204A over the path labeled as "2" to listen for data service requests associated with an application, and also programs processor A 204A to know to which of service handler circuits 210A-L to route incoming data service requests. As illustrated, processor A 204A receives incoming traffic 202 over the path labeled as "3." Processor A 204A classifies incoming data service requests according to their associated application. Having been programmed to know service handler circuits associated with applications, processor A 204A routes a data service request to the appropriate service handler circuit, here, service L handler circuit 210L, over the path labeled as "4." After processing the data service request, service handler circuit 210L provides a response to processor A 204A over the path labeled as "5." In some embodiments, the data service request does not warrant a response, in which case the exemplary flow ends after service L handler circuit 210L processes the data service request. As illustrated, processor A 204A forwards the response to an Application A client over the path labeled as "6."

In some embodiments, incoming traffic 202 is routed to processor B 204B, which operates similarly (e.g. incoming traffic 202 is received by service 206B). In some embodiments Service Routing Agent 208B is programmed by orchestrator 212 with a default configuration of active service handler circuits, and, in turn, programs processor B 204B to know which data service requests to listen for and to which service handler circuits to route them. Accordingly, in some embodiments, processor B 204B receives a data service request on incoming traffic 202, classifies it according to an associated application, routes it to the appropriate service handler circuit, receives a response, and transmits the response to an application on the cloud.

In some embodiments, incoming traffic 202 is routed to processor B 204M, which operates similarly (e.g., incoming traffic 202 is received by service 206M). In some embodiments Service Routing Agent 208B is programmed by orchestrator 212 with a default configuration of active service handler circuits, and, in turn, programs processor B 204M to know which data service requests to listen for and to which service handler circuits to route them. Accordingly, in some embodiments, processor B 204M receives a data service request on incoming traffic 202, classifies it according to an associated application, routes it to the appropriate service handler circuit, receives a response, and transmits the response to an application on the cloud.

In some embodiments, a copy of incoming traffic 202 is routed to each of processor A 204A, processor B 204B, and processor M 204M. In alternate embodiments, incoming traffic 202 is routed to multiple separate network interfaces, one for each of processor A 204A, processor B 204B, and processor M 204M.

In one embodiment, Service Routing Agent 208A programs processor A 204A over the path labeled as "2" to listen for Transmission Control Packets (TCP) and Stream Control Transmission Protocol (SCTP) packets arriving on port 3868, which has been defined in RFC 6733 as the port running the Diameter protocol for both TCP and SCTP. In some embodiments, the diameter protocol is defined by at least RFC 6733. Embodiments disclosed herein are not to be limited to any particular protocol: The Service Routing Agent 308A may program processor A 204A to listen for packets defined by additional protocols, such as transport protocols defined with respect to 5G networks.

In some embodiments, Service Routing Agent 208A programs processor A over the path labeled as "2" to listen for UDP packets arriving on port 1813, which is dedicated to RADIUS protocol-based traffic, which is defined by at least RFC2866.

Processors 322A-N in some embodiments are comprised of hardware circuits. In other embodiments, processors 322A-N are implemented as software routines consisting of computer-executable instructions that, when executed, perform at least one embodiment disclosed herein. In alternate embodiments, processors 322A-N are virtual machines.

Service Routing Agent 302 in some embodiments is implemented as a hardware circuit. In other embodiments, Service Routing Agent 302 is implemented as a software routine consisting of computer-executable instructions that, when executed by a processor or processor core, perform at least one embodiment disclosed herein. In alternate embodiments, Service Routing Agent 302 is implemented as a virtual machine.

Service handler circuits 320A-M in some embodiments are comprised of hardware circuits. In other embodiments, service handler circuits 320A-M are implemented as software routines consisting of computer-executable instructions that, when executed, perform at least one embodiment disclosed herein. In alternate embodiments, service handler circuits 320A-M are virtual machines.

Orchestrator 318 in some embodiments is implemented as a hardware circuit. In other embodiments, Orchestrator 318 is implemented as a software routine consisting of computer-executable instructions that, when executed by a processor or processor core, perform at least one embodiment disclosed herein. In alternate embodiments, Orchestrator 318 is implemented as a virtual machine.

In some embodiments, one or more of Service Routing Agent 302, orchestrator 318, service handler circuits 320A-M, and processors 322A-M, may be implemented as software routines to be executed by one or more processors. In some embodiments, one or more of Service Routing Agent 302, orchestrator 318, service handler circuits 320A-M, and processors 322A-M, may be implemented as virtual machines.

Figure 3:
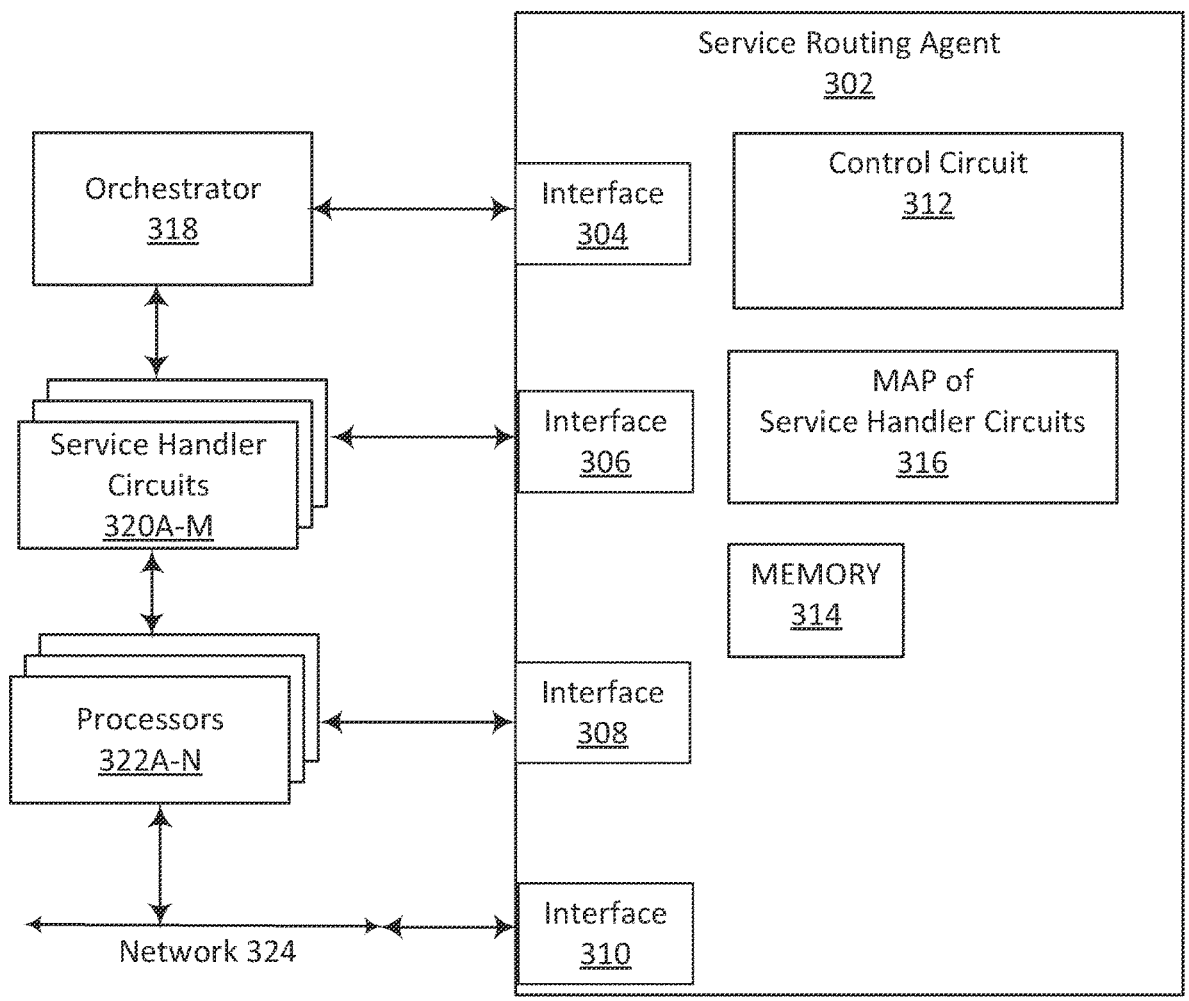
FIG. 3 is a block diagram of an embodiment of a Service Routing Agent.

As illustrated in the embodiment of FIG. 3, Service Routing Agent 302 includes a number of interfaces 304, 306, 308, and 310, a control circuit 312, a memory 314, and a map of service handler circuits 316. In some embodiments, two or more of interfaces 304, 306, 308, and 310 share a physical interface, for example an Ethernet interface. Interface 304 is to couple Service Routing Agent 302 to an orchestrator 318. Interface 306 is to couple Service Routing Agent 302 to at least one of service handler circuits 320A-M. Interface 308 is to couple Service Routing Agent 302 to at least one of processors 322A-N. Interface 310 is to couple Service Routing Agent 302 to a system bus 324, which in some embodiments is used to couple Service Routing Agent 302 to other circuits and system resources, including as a path to orchestrator 318, service handler circuits 320A-M, or processors 322A-N.

In some embodiments, control circuit 312 is to implement functions of embodiments disclosed herein. In some embodiments, control circuit 312 is a physical processor or processor core configured to implement functions disclosed herein. In some embodiments, control circuit 312 is a virtual processor. In some embodiments, control circuit 312 is implemented as a software routine including computer-executable instructions to be executed by a processor. In some embodiments, the computer-executable instructions consist of micro-instructions stored in memory 314 and which, when executed, cause the processor to perform functions of embodiments disclosed herein.

In some embodiments, a map of service handler circuits 316 is used by the control circuit after receiving a data service request and while selecting a service handler circuit 320A-M to which to transmit the request. The data service request and the selected service handler circuit in some embodiments are associated with an application. The map of service handler circuits 316 in some embodiments identifies which service handler circuits 320A-M are to process requests relating to the application to which the data service request is associated. The map of service handler circuits 316 in some embodiments also includes information on how to communicate with service handler circuits 320A-M, such as, for example, Internet Protocol (IP) addresses for the service handler circuits 320A-M. In an embodiment, the map of service handler circuits 316 is created based on configuration information received from orchestrator 318.

Figure 4:
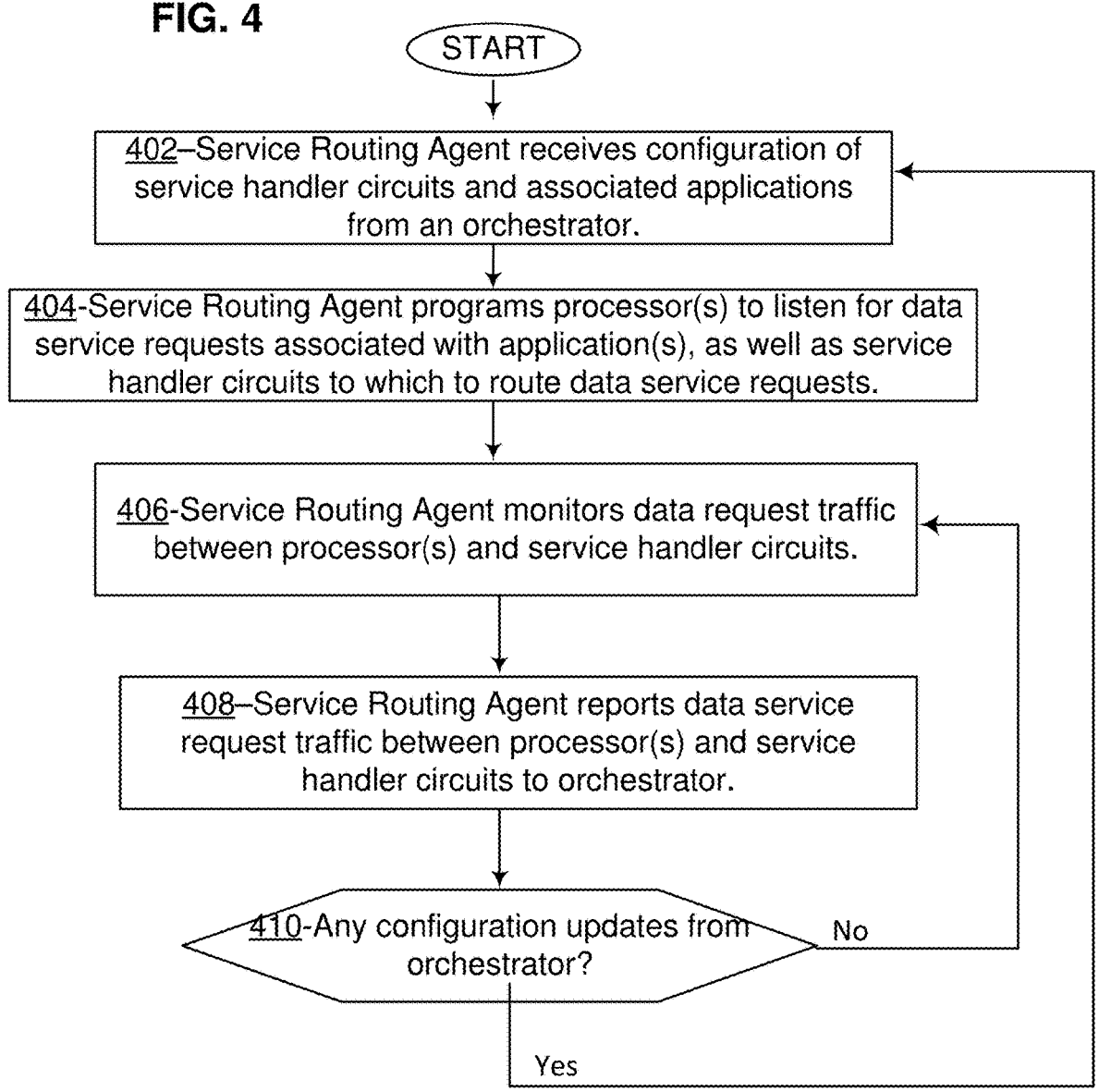
FIG. 4 is a flow diagram illustrating an embodiment of a process conducted by a Service Routing Agent in a method and system of classifying and routing a data service request.

FIG. 4 is a flow diagram illustrating an embodiment of a process conducted by a Service Routing Agent to classify and route a data service request. At 402, the Service Routing Agent receives configuration of service handler circuits and associated applications. In some embodiments, the configuration is received from an orchestrator. In some embodiments, the configuration is read from a memory. In some embodiments, the configuration is a default configuration. At 404, the Service Routing Agent programs processor(s) to listen for data service requests associated with application(s), as well as service handler circuits to which to route data service requests. In some embodiments, more than one processor exists to be programmed by the Service Routing Agent at 404 as indicated by the parenthetical "(s)." At 406, the Service Routing Agent monitors data request traffic between processor(s) and service handler circuits. At 408, the Service Routing Agent reports data service request traffic between processor(s) and service handler circuits to an orchestrator. In some embodiments, the Service Routing Agent may attempt to reduce latencies by itself by communicating with and scaling out a service handler circuit, thereby avoiding waiting for the orchestrator to do so. At 410, the Service Routing Agent determines whether any configuration updates have been received from the orchestrator. If so, the process returns to 402, during which the Service Routing Engine receives configuration form the orchestrator of service handler circuits and associated applications. If not, the process returns to 406, during which Service Routing Agent monitors data request traffic between processor(s) and service handler circuits.

Figure 5:
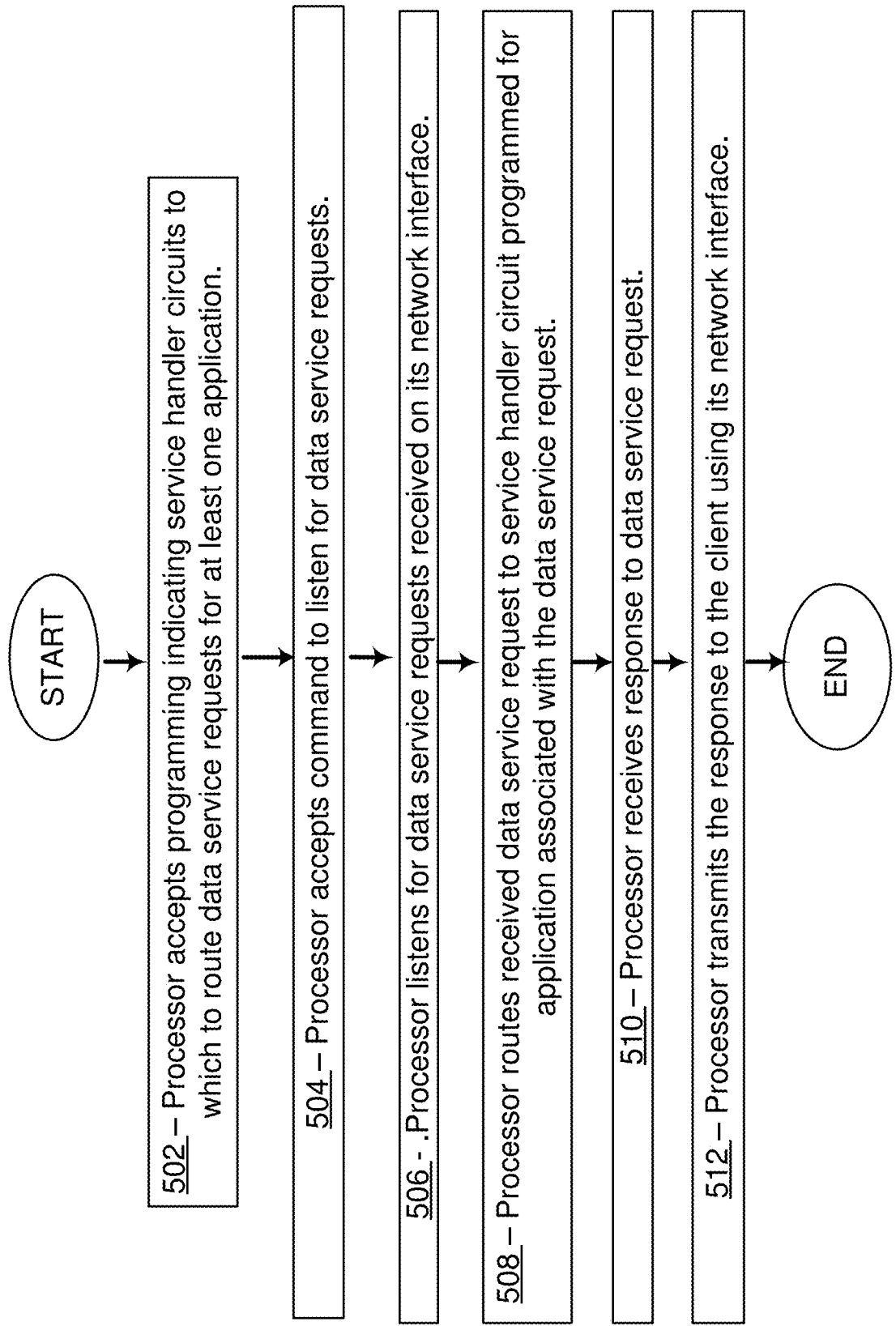
FIG. 5 is a flow diagram illustrating an embodiment of a process conducted by a processor in a method and system of classifying and routing a data service request.

FIG. 5 is a flow diagram illustrating an embodiment of a process conducted by a processor to classify and route a data service request. At 502, the processor accepts programming indicating service handler circuits to which to route data service requests for at least one application. At 504, the processor accepts command to listen for data service requests. At 506, the processor listens for data service requests received on its network interface. At 508, the processor routes the received data service request to service handler circuit programmed for application associated with the data service request. At 510, the processor receives response to data service request. At 512, the processor transmits the response to the client using its network interface.

Figure 6:
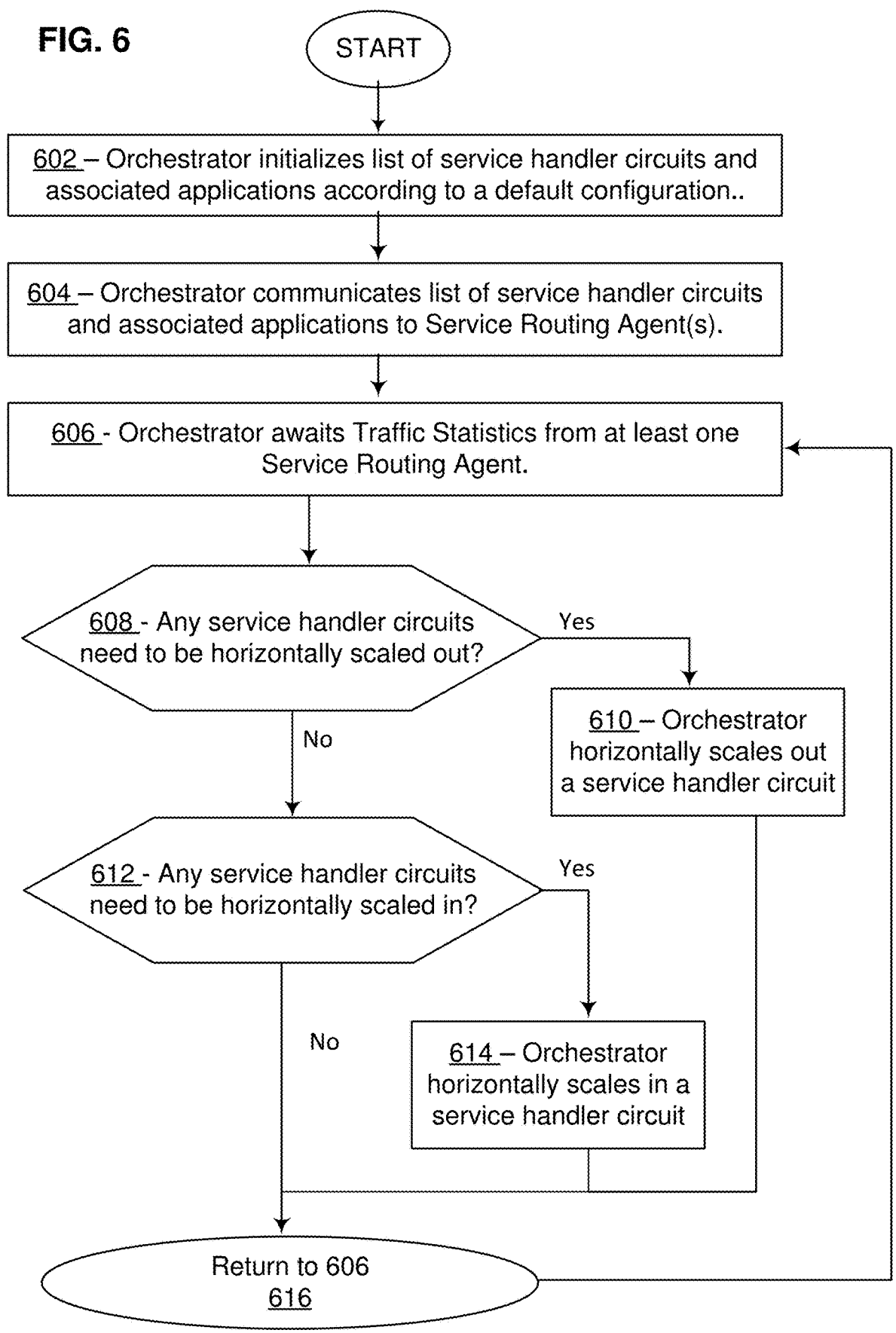
FIG. 6 is a flow diagram illustrating a process conducted by an orchestrator in an embodiment of a method and system of classifying and routing a data service request.

FIG. 6 is a flow diagram illustrating an embodiment of a process conducted by an orchestrator to classify and route a data service request. At 602, the orchestrator initializes a list of service handler circuits and associated applications according to a default configuration. In an embodiment, the orchestrator reads configuration data from a memory. In some embodiments, the orchestrator explores data center resources to identify available processing resources to use as service handler circuits. In some embodiments, the orchestrator provides a user interface by which an administrator can enter configuration information. At 604, the orchestrator communicates the list of service handler circuits and associated applications to Service Routing Agent(s).

At 606, the orchestrator awaits Traffic Statistics from at least one Service Routing Agent. Traffic Statistics include information that allows the orchestrator to make a scaling decision. In some embodiments, the Service Routing Agent has been configured to allow traffic from for a single or for a group of services representing at least one network slice, and Traffic Statistics received by the orchestrator correspond to the at least one network slice. In alternate embodiments, the Traffic Statistics received by the orchestrator are on a per-service basis. In deciding whether to scale out or scale in, the orchestrator may apply access privileges defined on a per-service or per-slice basis, and may apply traffic quotas defined on a per-slice or per-service basis.

At 608, the orchestrator analyzes the traffic statistics to determine whether any service handler circuits need to be horizontally scaled out. If so, at 610, the orchestrator horizontally scales out a service handler circuit. But, if not, at 612, the orchestrator analyzes the traffic statistics to determine whether any service handler circuits need to be horizontally scaled in. If so, at 614, the orchestrator horizontally scales in a service handler circuits. But, if not, at 616, the process returns to 606, and the orchestrator awaits traffic statistics from at least one service routing agent.

Figure 7:
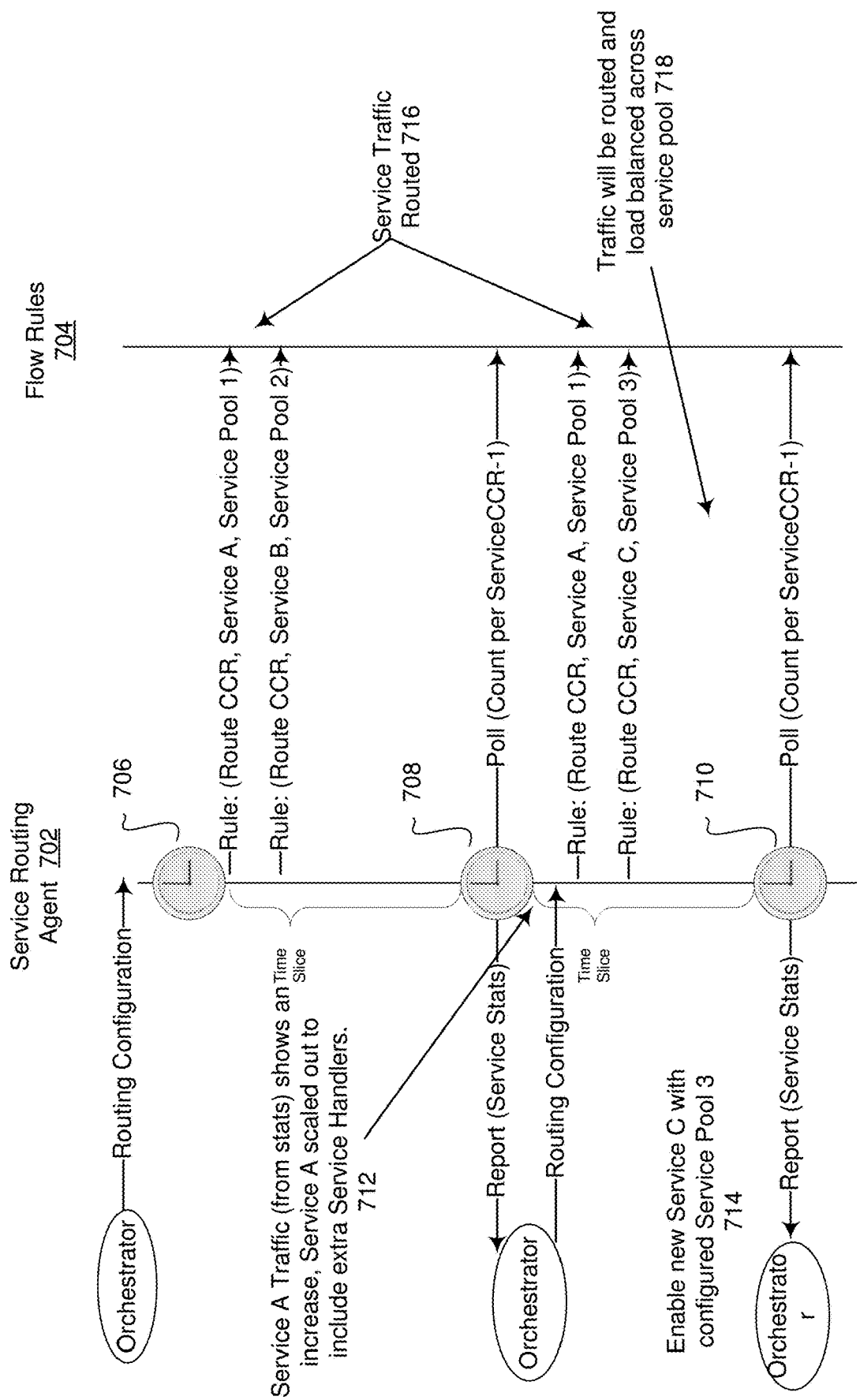
FIG. 7 is a timing diagram illustrating an embodiment of a process of scaling out a processing resource.

FIG. 7 is a timing diagram illustrating an embodiment of a process of scaling out a processing resource. As shown, a timeline illustrates activity of Service Routing Agent 702, which generates flow rules 704 over three units of time, 706, 708, and 710. In some embodiments, at each of times 706, 708, and 710, the Service Routing Agent communicates with an orchestrator to report service statistics (at 708 and 710) and to receive routing configuration (at 706 and 708).

In some embodiments, when maximum scaling has been reached (e.g. no more servers are available to deploy new service handlers), the policy configured in the service routing e.g. 206A will differentiate based on a set of criteria such as weights which services are granted access to the service handlers. In some embodiments, the services associated with each of the diameter request packets are discovered by reading the attribute-value pairs (AVPs) in the messages. Differentiating on a per-service basis allows per-service control and a way of implementing network slicing, for example in 5G networks.

The service routing policy may be configured to restrict non-critical, lower priority workloads such as M2M/IoT devices during periods of high load on the network, allowing the network to prioritize critical devices. In some embodiments, the policy may be re-configured dynamically based on load. Allowing the policy to be configured on a per-load or per-service basis may also reduce priority for requests from rogue or misbehaving devices, to reduce their chances of causing high load on the network.

As illustrated, Service Routing Agent configures two Rules after time 716, one route to Service A of Service Pool 1, and the other to Service B of Service Pool B. After time 708, Service A traffic shows an increase, and the associated service pool will be scaled out to include extra Service Handlers at 712. In particular, the service stats reported by the Service Routing Agent at 708 informed the orchestrator that service pool A needed to be scaled out. Accordingly, after time 708, routing configuration arrives from the orchestrator, showing Service Pool 2, providing service A, is scaled out. The routing configuration also shows that a new route to service pool 3 providing service C is configured at 714. In some embodiments, by time 710, traffic will be routed and load balanced across service pools at 718.

Figure 8:
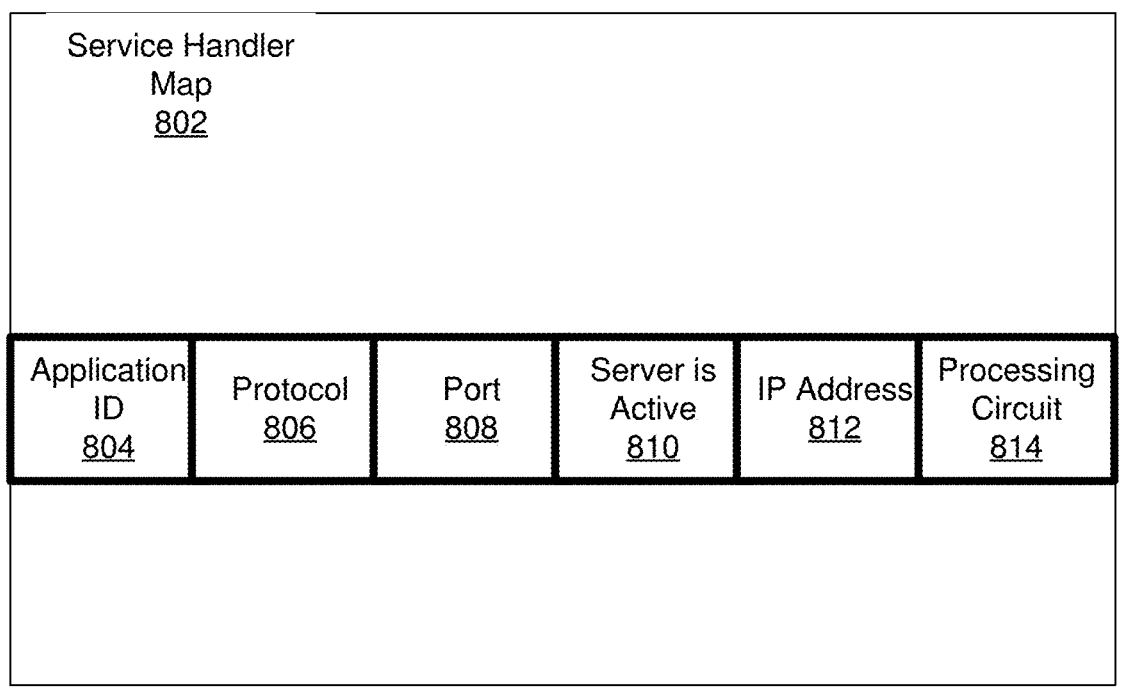
FIG. 8 illustrates an embodiment of a service handler map of applications-to-service handler circuits.

FIG. 8 illustrates an embodiment of a service handler map of applications-to-service handler circuits. As shown, in some embodiments, one row of service handler map 802 contains information to uniquely identify a client-server application data flow, including application ID 804, protocol 806, port 808, server is active 810, IP address 812, and processing circuit 814. In some embodiments, additional fields are stored in each row. In some embodiments, a Service Routing Agent is to maintain a service handler map 802 of service handler circuit with various applications.

Service Routing Agent is to use service handler map 802 to determine where to forward received data service requests. In some embodiments, the map is stored in a memory within a Service Routing Agent, which uses the map to determine which service handler circuit should receive a data service request. In other embodiments, the map is stored in a memory in the orchestrator in addition to memory in the Service Routing Agent.

In such embodiments, incoming data service requests are classified according at least to an associated application, and are routed to a particular service handler circuit. In some embodiments, a mapping, such as illustrated in FIG. 8 is used to support such classification and routing.

Figure 9:
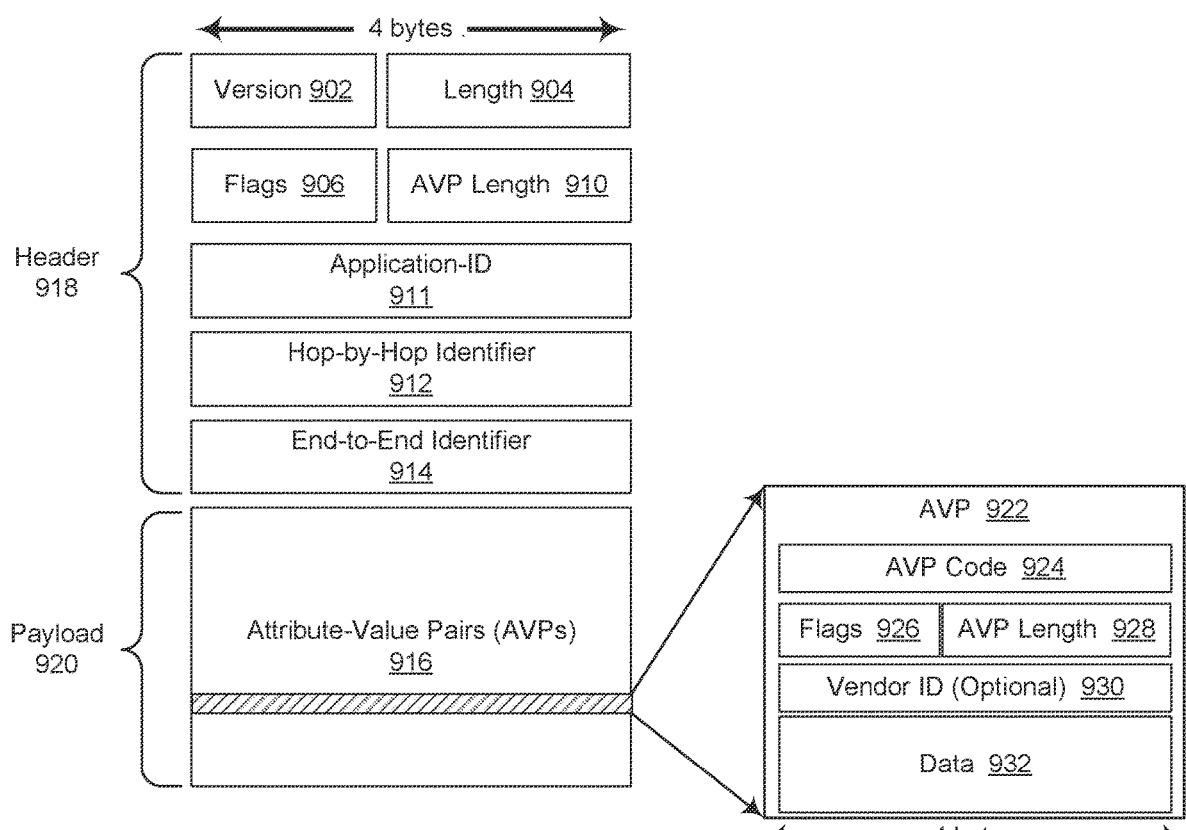
FIG. 9 illustrates a data service request packet according to an embodiment.

FIG. 9 illustrates a data service request packet according to an embodiment. As shown, the data service request packet includes version 902, length 904, flags 906, AVP length 910, Application-ID 911, Hop-by-Hop identifier 912, End-to-End Identifier 914, included in header 918, and Attribute-Value Pairs (AVPs) 916, included as payload 920. Also shown is exemplary AVP 922, which includes AVP code 924, flags 926, AVP length 928, vendor ID 930, and data 932.

Embodiments disclosed herein are not meant to be limited to the format and the AVPs described herein; embodiments disclosed herein may support messages with additional AVPs and different formats, without limitation.

In some embodiments, the various fields of the data service request embodiment of FIG. 9 are described in RFC 6733, published by the IETF. As of October, 2012, RFC6733 defined a Diameter Header as follows. A summary of the Diameter header format is shown below. The fields are transmitted in network byte order.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Version    |                 Message Length                |
+-+-+-+-+-+-+-+-+-+-+-+-+-+-+-+-+-+-+-+-+-+-+-+-+-+-+-+-+-+-+-+-+
| Command Flags |              Command Code                     |
+-+-+-+-+-+-+-+-+-+-+-+-+-+-+-+-+-+-+-+-+-+-+-+-+-+-+-+-+-+-+-+-+
|                        Application-ID                         |
+-+-+-+-+-+-+-+-+-+-+-+-+-+-+-+-+-+-+-+-+-+-+-+-+-+-+-+-+-+-+-+-+
|                      Hop-by-Hop Identifier                    |
+-+-+-+-+-+-+-+-+-+-+-+-+-+-+-+-+-+-+-+-+-+-+-+-+-+-+-+-+-+-+-+-+
|                      End-to-End Identifier                    |
+-+-+-+-+-+-+-+-+-+-+-+-+-+-+-+-+-+-+-+-+-+-+-+-+-+-+-+-+-+-+-+-+
| AVPs ...
+-+-+-+-+-+-+-+-+-+-+-+-
```

Version

This Version field is set to 1 to indicate Diameter Version 1.

Message Length

The Message Length field is three octets and indicates the length of the Diameter message including the header fields and the padded AVPs. Thus, the Message Length field is a multiple of 4.

Command Flags

The Command Flags field is eight bits. The following bits are assigned:

```
 0 1 2 3 4 5 6 7
+-+-+-+-+-+-+-+-+
|R P E T r r r r|
+-+-+-+-+-+-+-+-+
```

R(equest)

If set, the message is a request. If cleared, the message is an answer.

P(roxiable)

If set, the message MAY be proxied, relayed, or redirected. If cleared, the message MUST be locally processed.

E(rror)

If set, the message contains a protocol error, and the message will not conform to the CCF described for this command.

Messages with the 'E' bit set are commonly referred to as error messages. This bit MUST NOT be set in request messages (see Section 7.2).

T (Potentially Retransmitted Message)

This flag is set after a link failover procedure, to aid the removal of duplicate requests. It is set when resending requests not yet acknowledged, as an indication of a possible duplicate due to a link failure. This bit MUST be cleared when sending a request for the first time; otherwise, the sender MUST set this flag. Diameter agents only need to be concerned about the number of requests they send based on a single received request; retransmissions by other entities need not be tracked. Diameter agents that receive a request with the T flag set, MUST keep the T flag set in the forwarded request. This flag MUST NOT be set if an error answer message (e.g., a protocol error) has been received for the earlier message. It can be set only in cases where no answer has been received from the server for a request, and the request has been sent again. This flag MUST NOT be set in answer messages.

r(eserved)

These flag bits are reserved for future use; they MUST be set to zero and ignored by the receiver.

Command Code

The Command Code field is three octets and is used in order to communicate the command associated with the message. The 24-bit address space is managed by IANA (see Section 3.1). Command Code values 16,777,214 and 16,777,215 (hexadecimal values FFFFFE-FFFFFF) are reserved for experimental use (see Section 11.2).

Application-ID

Application-ID is four octets and is used to identify for which application the message is applicable. The application can be an authentication application, an accounting application, or a vendor-specific application.

The value of the Application-ID field in the header MUST be the same as any relevant Application-Id AVPs contained in the message.

Hop-by-Hop Identifier

The Hop-by-Hop Identifier is an unsigned 32-bit integer field (in network byte order) that aids in matching requests and replies. The sender MUST ensure that the Hop-by-Hop Identifier in a request is unique on a given connection at any given time, and it MAY attempt to ensure that the number is unique across reboots. The sender of an answer message MUST ensure that the Hop-by-Hop Identifier field contains the same value that was found in the corresponding request. The Hop-by-Hop Identifier is normally a monotonically increasing number, whose start value was randomly generated. An answer message that is received with an unknown Hop-by-Hop Identifier MUST be discarded.

End-to-End Identifier

The End-to-End Identifier is an unsigned 32-bit integer field (in network byte order) that is used to detect duplicate messages. Upon reboot, implementations MAY set the high order 12 bits to contain the low order 12 bits of current time, and the low order 20 bits to a random value. Senders of request messages MUST insert a unique identifier on each message. The identifier MUST remain locally unique for a period of at least 4 minutes, even across reboots. The originator of an answer message MUST ensure that the End-to-End Identifier field contains the same value that was found in the corresponding request. The End-to-End Identifier \MUST NOT be modified by Diameter agents of any kind. The combination of the Origin-Host AVP (Section 6.3) and this field is used to detect duplicates. Duplicate requests SHOULD cause the same answer to be transmitted (modulo the Hop-by-Hop Identifier field and any routing AVPs that may be present), and they MUST NOT affect any state that was set when the original request was processed. Duplicate answer messages that are to be locally consumed (see Section 6.2) SHOULD be silently discarded.

AVPs

AVPs are a method of encapsulating information relevant to the Diameter message. See Section 4 for more information on AVPs.

3.1. Command Codes

Each command Request/Answer pair is assigned a Command Code, and the sub-type (i.e., request or answer) is identified via the 'R' bit in the Command Flags field of the Diameter header. Every Diameter message MUST contain a Command Code in its header's Command Code field, which is used to determine the action that is to be taken for a particular message. The following Command Codes are defined in the Diameter base protocol:

| Command Name | Abbrev. | Section Code | Reference |
|---|---|---|---|
| Abort-Session-Request | ASR | 274 | 8.5.1 |
| Abort-Session-Answer | ASA | 274 | 8.5.2 |
| Accounting-Request | ACR | 271 | 9.7.1 |
| Accounting-Answer | ACA | 271 | 9.7.2 |
| Capabilities-Exchange-Request | CER | 257 | 5.3.1 |
| Capabilities-Exchange-Answer | CEA | 257 | 5.3.2 |
| Device-Watchdog-Request | DWR | 280 | 5.5.1 |
| Device-Watchdog-Answer | DWA | 280 | 5.5.2 |
| Disconnect-Peer-Request | DPR | 282 | 5.4.1 |
| Disconnect-Peer-Answer | DPA | 282 | 5.4.2 |
| Re-Auth-Request | RAR | 258 | 8.3.1 |
| Re-Auth-Answer | RAA | 258 | 8.3.2 |
| Session-Termination-Request | STR | 275 | 8.4.1 |
| Session-Termination-Answer | STA | 275 | 8.4.2 |

Figure 10:
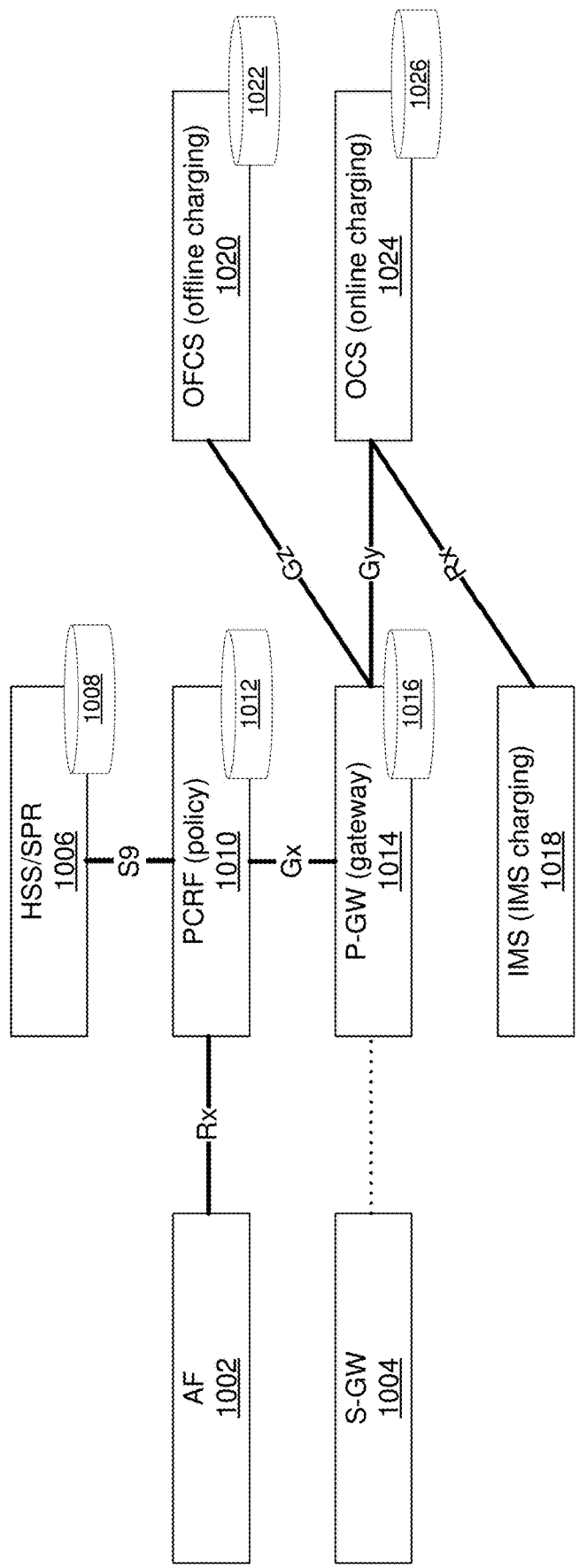
FIG. 10 is a block diagram illustrating an embodiment of a network layout among various Diameter nodes.

FIG. 10 is a block diagram illustrating an embodiment of a network layout among various Diameter nodes. In some embodiments, service handler circuits as described herein are dedicated to particular services, as defined by various Diameter nodes. In some embodiments, each diameter node is implemented by a dedicated service handler circuit, while in other embodiments a service handler circuit implements multiple Diameter nodes. In some embodiments, service handler circuits are implemented by physical processors or processor cores to execute instructions to implement embodiments disclosed herein. In some embodiments, service handler circuits are implemented as virtual processors. In some embodiments, service handler circuits are implemented as software routines of executable instructions that, when executed by a processer, cause the processor to implement functions of a service handler circuit as described herein.

As shown, FIG. 10 illustrates an embodiment of a network of Diameter Nodes, the nodes being defined as follows:

| Node Acronym | Full Node Name | Node Functions |
|---|---|---|
| AF (1002) | Application Function | The AF platform (for example, P-CSCF) supports control of bearer resources and flow based bearer charging. It communicates with the PCRF to transfer QoS related service information. |
| S-GW (1004) | Signaling Gateway | A Signaling Gateway (SGW) interfaces with the signaling plane of the CS (Circuit Switched domain). It transforms lower layer protocols as Stream Control Transmission Protocol (SCTP, an Internet Protocol (IP) protocol) into Message Transfer Part (MTP, a Signaling System 7 (SS7) protocol), to pass ISDN User Part (ISUP) from the MGCF to the CS network. |
| HSS/SPR (1006) | Home Subscriber Server/ Subscription Profile Repository | The HSS is the next generation subscriber data management platform. Like the HLR, it is the primary subscriber database that contains user-related and subscription-related information. Its functions include HLR and AuC functionality as well as mobility management, user security information and key generation, service authorization support, access support and authorization and call session establishment support. The SPR contains subscriber related information on subscriptions for use by PCRF for policy enforcement on bearer services. The SPR can contain information on a subscriber's allowed services, QoS, IMS capabilities, special policies, quota/spending limits and other subscriber related data and subscriptions. |
| PCRF (1010) | Policy and Charging Rules Function | The Policy and Charging Rules Function (PCRF) acts as a policy decision point for policy and charging control of service data flows and applications that is sends to the PCEF for enforcement. |
| P-GW (1014) | PDN (Packet Data Network) Gateway | The PGW provides gateway functionality between the EPC and both private and public IP networks (for example, the Internet). It provides policy enforcement of user plane services and control plane tunnel management for the PLMN. |
| IMS (1018) | IP Multimedia Subsystem Access Gateway | The PGW provides gateway functionality between the EPC and both private and public IP networks (for example, the Internet). It provides policy enforcement of user plane services and control plane tunnel management for the PLMN. |
| OFCS (1020) | Offline Charging System | The OFCS performs various charging functions used for offline charging. It collects and processes charging events and it generates CDRs for |

-continued

| Node Acronym | Full Node Name | Node Functions |
|---|---|---|
| OCS (1024) | Online Charging System | subsequent offline downstream billing processes. The OCS supports real-time usage based charging of event and session based bearer services. It also provides account balance management in conjunction with other platforms such as recharge servers. It supports monitoring of spending and usage limits and enables enforcement through the PCRF and PCEF functions. |

In some embodiments, service handler circuits described herein implement a network of Diameter nodes, in which Diameter AF node 1002 is connected to PCRF (policy) node 1010 using diameter interface Rx. S-GW node 1004 is connected to P-GW (gateway) by a non-Diameter interface. HSS/SPR node 1006 is connected to PCRF (policy) 1010 via an S9 Diameter interface. PCRF (policy) node 1010 is connected to P-GW (gateway) node 1014. P-GW (gateway) node 1014 is connected to IMS (IMS charging) node 1018. IMS (IMS charging) 1018 is connected to OCS (online charging) node 1024. P-GW (gateway) node 1014 is connected with OCS (online charging) node 1024 with a Gy Diameter interface, and with OFCS (offline charging) node 1020 via a Gz Diameter interface. As illustrated HSS/SPR node 1006, PCRF (policy) node 1110, P-GW (gateway) node 1014, OFCS (offline charging) node 1020, and OCS (online charging) node 1024 include memories 1008, 1012, 1016, 1022, and 1026, respectively.

Figure 11:
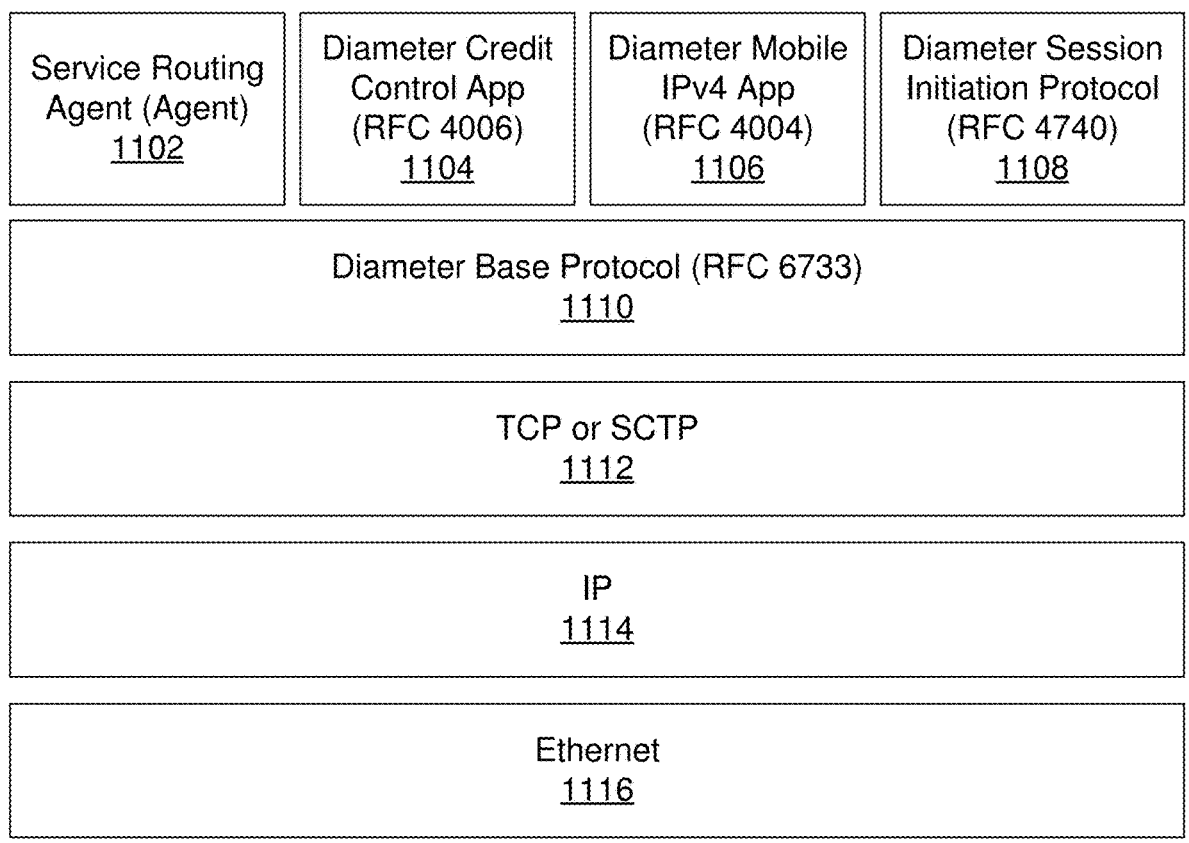
FIG. 11 illustrates an embodiment of a network abstraction layer at which a Service Routing Agent resides.

FIG. 11 illustrates an embodiment of a network abstraction layer at which a Service Routing Agent resides. As shown, the Diameter base protocol (RFC 6733) 1110 sits above the transport layer when it is viewed in the OSI (Opens Systems Interconnection) layered architecture. It uses the transport services provided by either TCP or SCTP layers 1112, which in turn use IP 1114 and Ethernet 1116 as layers below. Sitting atop the Diameter base protocol (RFC 6733) 1110 are the Diameter session initiation protocol (RFC 4740) 1108, the Diameter mobile IPv4 Application (RFC 4004) 1106, and the Diameter credit control application (RFC 4006) 1104. Also at a level above the Diameter base protocol (RFC 6733) 1110 is the Service Routing Agent node 1102, which has been described above.

EXAMPLES

Example 1 provides a Service Routing Agent, which includes at least one interface circuit coupled to exchange signals with an orchestrator, at least one processor, at least one service handler circuit, and at least one control circuit. The control circuit is to: receive a configuration of the at least one service handler circuit and its associated application, initialize a list of the at least one service handler circuit and its associated application, program the at least one processor to listen for data service requests associated with the application, receive a data service request from the at least one processor, and determine whether at least one service handler circuit associated with the application has been activated. When the at least one service handler circuit has been activated, the control circuit is to forward the data service request to the at least one service handler circuit. When the at least one service handler circuit has not been activated, the control circuit is to request that the at least one service handler circuit be activated, and then forward the data service request to the at least one service handler circuit, receive a response to the data service request from the at least one service handler circuit, forward the response to a requesting client, and update and report traffic statistics to the orchestrator.

Example 2 includes the subject matter of example 1. In this example, the configuration is to include an Internet Protocol (IP) address for each of the processing circuits.

Example 3 includes the subject matter of example 1. In this example, the orchestrator, in response to the reported traffic statistics, is to scale out a number of active processing circuits to accommodate a traffic volume above a high threshold, and to scale in the number of active processing circuits when the traffic volume is lower than a low threshold.

Example 4 includes the subject matter of example 1. In this example, the initializing the list of the at least one service handler circuit includes receiving configuration data from the orchestrator.

Example 5 includes the subject matter of example 1. In this example, programming the at least one processor includes programming the processor to listen for at least one of a transmission control protocol (TCP) packet arriving on port number 3868 and formatted according to a DIAMETER format, and a stream control transmission protocol (SCTP) packet on port number 3868, and formatted according to the DIAMETER format.

Example 6 includes the subject matter of example 1. In this example, the control circuit is further to: when the at least one service handler circuit has not been activated, identify at least a second service handler circuit that has been activated, and forward the data service request to the at least second service handler circuit.

Example 7 includes the subject matter of example 1. In this example, programming the at least one processor includes programming the processor to listen for a user datagram protocol (UDP) and formatted according to a RADIUS format.

Example 8 provides a method to be performed by a Service Routing Agent. The method includes receiving configuration information identifying service handler agents and applications associated therewith, initializing a list of at least one service handler circuit and an application associated therewith, programming at least one processor to listen for data service requests associated with the application, receiving a data service request from the at least one processor, determining whether a service handler circuit associated with the application has been activated, when the service handler circuit associated with the application has been activated, forwarding the data service request to the service handler circuit, and when the service handler circuit associated with the application has not been activated, requesting that the service handler circuit associated with the application be activated, and then forwarding the data service request to the service handler circuit, receiving a response to the data service request from the service handler circuit associated with the application, forwarding the response to a requesting client, and updating and reporting traffic statistics to an orchestrator.

Example 9 includes the subject matter of example 8. In this example, the at least one service handler circuit includes a pool of at least two processing circuits, further including conducting a load balancing to select one processing circuit from among the pool of processing circuits to which to forward the data service request.

Example 10 includes the subject matter of example 9. In this example, the configuration information is to include an Internet Protocol (IP) address for each of the processing circuits.

Example 11 includes the subject matter of example 8. In this example, the initializing the list of at least one service handler circuit includes receiving configuration data from the orchestrator.

Example 12 includes the subject matter of example 8. In this example, programming the at least one processor includes programming the processor to listen for a transmission control protocol (TCP) packet arriving on port number 3868 and formatted according to a DIAMETER format.

Example 13 includes the subject matter of example 8. In this example, programming the at least one processor includes programming the processor to listen for a stream control transmission protocol (SCTP) packet on port number 3868, and formatted according to a DIAMETER format.

Example 14 includes the subject matter of example 8. In this example, programming the at least one processor includes programming the processor to listen for a user datagram protocol (UDP) and formatted according to a RADIUS format.

Example 15 includes the subject matter of example 8. In this example, the Service Routing Agent communicates with the at least one processor through a first interface, with the at least one service handler circuit through a second interface, and with the orchestrator through a third interface.

Example 16 provides a non-transitory computer-readable medium containing computer executable instructions that, when executed by at least one control circuit in a Service Routing Agent, cause the Service Routing Agent to perform a method including: receiving configuration information identifying service handler agents and applications associated therewith, initializing a list of at least one service handler circuit and an application associated therewith, programming at least one processor to listen for data service requests associated with the application, receiving a data service request from the at least one processor, determining whether a service handler circuit associated with the application has been activated, when the service handler circuit associated with the application has been activated, forwarding the data service request to the service handler circuit associated with the application, and when the service handler circuit associated with the application has not been activated, requesting that the service handler circuit associated with the application be activated, and then forwarding the data service request to the service handler circuit associated with the application, receiving a response to the data service request from the at least one service handler circuit, forwarding the response to a requesting client, and updating and reporting traffic statistics to an orchestrator.

Example 17 includes the subject matter of example 16. In this example, the at least one service handler circuit includes a pool of at least two processing circuits, further including conducting a load balancing to select one processing circuit from among the pool of processing circuits to which to forward the data service request.

Example 18 includes the subject matter of example 17. In this example, the configuration information is to include an Internet Protocol (IP) address for each of the processing circuits.

Example 19 includes the subject matter of example 16. In this example, the initializing the list of at least one service handler circuit includes receiving configuration data from the orchestrator.

Example 20 includes the subject matter of example 16. In this example, programming the at least one processor includes programming the processor to listen for a transmission control protocol (TCP) packet arriving on port number 3868 and formatted according to a DIAMETER format.

Example 21 includes the subject matter of example 16. In this example, programming the at least one processor includes programming the processor to listen for a stream control transmission protocol (SCTP) packet on port number 3868, and formatted according to a DIAMETER format.

Example 22 includes the subject matter of example 16. In this example, programming the at least one processor includes programming the processor to listen for a user datagram protocol (UDP) and formatted according to a RADIUS format.

Example 23 includes the subject matter of example 16. In this example, the Service Routing Agent communicates with the at least one processor through a first interface, with the at least one service handler circuit through a second interface, and with the orchestrator through a third interface.

Example 24 provides a Service Routing Agent, including means for interfacing a circuit to exchange signals with an orchestrator, at least one processor, at least one service handler circuit, and a control circuit to: receive a configuration of at least one service handler circuit and its associated application, initialize a list of the at least one service handler circuit and its associated application, program the at least one processor to listen for data service requests associated with the application, receive a data service request from the at least one processor, determine whether a service handler circuit associated with the application has been activated, when the service handler circuit associated with the application has been activated, forward the data service request to the service handler circuit associated with the application, when the service handler circuit associated with the application has not been activated, request that the service handler circuit be activated, and then forward the data service request to the service handler circuit associated with the application, receive a response to the data service request from the service handler circuit, forward the response to a requesting client, and update and report traffic statistics to the orchestrator.

Example 25 includes the subject matter of example 24. In this example, the configuration is to include an Internet Protocol (IP) address for each of the processing circuits.

Example 26 includes the subject matter of any one of examples 24 and 25. In this example, the orchestrator, in response to the reported traffic statistics, is to scale out a number of active processing circuits to accommodate a traffic volume above a high threshold, and to scale in the number of active processing circuits when the traffic volume is lower than a low threshold.

Example 27 includes the subject matter of any one of examples 24 and 26. In this example, the initializing the list of at least one service handler circuit includes receiving configuration data from the orchestrator.

Example 28 includes the subject matter of any one of examples 24 and 27. In this example, programming the at least one processor includes programming the processor to listen for a transmission control protocol (TCP) packet arriving on port number 3868 and formatted according to a DIAMETER format.

Example 29 includes the subject matter of any one of examples 24 to 27. In this example, programming the at least one processor includes programming the processor to listen for a stream control transmission protocol (SCTP) packet on port number 3868, and formatted according to a DIAMETER format.

Example 30 includes the subject matter of any one of examples 24 to 27. In this example, programming the at least one processor includes programming the processor to listen for a packet selected from the group consisting of a transmission control protocol (TCP) packet arriving on port number 3868 and formatted according to a DIAMETER format, a stream control transmission protocol (SCTP) packet arriving on port number 3868, and formatted according to the DIAMETER format, and a user datagram protocol (UDP) packet formatted according to a RADIUS format.

Although some embodiments disclosed herein involve data handling and distribution in the context of hardware execution circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in machine-executable instructions. The instructions can be used to cause a general-purpose or special-purpose processor that is programmed with the instructions to perform the steps of the at least one embodiment. Embodiments disclosed herein may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program logic to perform the at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

What is claimed is:

1. A method comprising:
    obtaining configuration information identifying service handler agents and applications associated therewith;
    initializing a list of at least one service handler circuit and an application associated therewith;
    programming at least one processor to listen for data service requests associated with the application;
    obtaining a data service request from the at least one processor;
    classifying the data service request according to the associated application;
    monitoring traffic statistics of the at least one processor, the traffic statistics including a traffic volume of the data service requests associated with the application;
    in response to the traffic volume satisfying a threshold, activating at least one additional processing circuit to process the data service requests;
    determining a priority level of the data service request based on a network load;
    determining whether a service handler circuit associated with the application has been activated;
    when the service handler circuit associated with the application has been activated, forwarding the data service request to the service handler circuit based on the determined priority level of the data service request;
    when the service handler circuit associated with the application has not been activated, a control circuit is to perform operations including:
        requesting that the at least one service handler circuit be activated, and then forward the data service request to the at least one service handler circuit;
        identifying at least a second service handler circuit that has been activated and forwarding the data service request to the second service handler circuit;
    obtaining a response to the data service request from the service handler circuit associated with the application;
    forwarding the response to a requesting client; and
    updating and reporting the traffic statistics to an orchestrator.

2. The method of claim 1, wherein the at least one service handler circuit comprises a pool of at least two processing circuits, further comprising conducting a load balancing to select one processing circuit from among the pool of processing circuits to which to forward the data service request.

3. The method of claim 2, wherein the configuration information to include an Internet Protocol (IP) address for each of the processing circuits.

4. The method of claim 1, wherein the initializing the list of at least one service handler circuit comprises receiving configuration data from the orchestrator.

5. The method of claim 1, wherein programming the at least one processor comprises programming the processor to listen for a transmission control protocol (TCP) packet arriving on port number 3868 and formatted according to a DIAMETER format.

6. The method of claim 1, wherein programming the at least one processor comprises programming the processor to listen for a stream control transmission protocol (SCTP) packet on port number 3868, and formatted according to a DIAMETER format.

7. The method of claim 1, wherein programming the at least one processor comprises programming the processor to listen for a user datagram protocol (UDP) and formatted according to a RADIUS format.

8. The method of claim 1, wherein the Service Routing Agent communicates with the at least one processor through a first interface, with the at least one service handler circuit through a second interface, and with the orchestrator through a third interface.

9. A non-transitory computer-readable medium containing computer executable instructions that, when executed by at least one control circuit in a Service Routing Agent, cause the Service Routing Agent to perform a method comprising:

obtaining configuration information identifying service handler agents and applications associated therewith;
initializing a list of at least one service handler circuit and an application associated therewith;
programming at least one processor to listen for data service requests associated with the application;
obtaining a data service request from the at least one processor;
classifying the data service request according to the associated application;
monitoring traffic statistics of the at least one processor, the traffic statistics including a traffic volume of the data service requests associated with the application;
in response to the traffic volume satisfying a threshold, activating at least one additional processing circuit to process the data service requests;
determining a priority level of the data service request based on a network load;
determining whether a service handler circuit associated with the application has been activated;
when the service handler circuit associated with the application has been activated, forwarding the data service request to the service handler circuit associated with the application based on the determined priority level of the data service request;
when the service handler circuit associated with the application has not been activated, the control circuit is to perform operations including:
requesting that the at least one service handler circuit be activated, and then forward the data service request to the at least one service handler circuit;
identifying at least a second service handler circuit that has been activated and forwarding the data service request to the second service handler circuit;
obtaining a response to the data service request from the at least one service handler circuit;
forwarding the response to a requesting client; and
updating and reporting the traffic statistics to an orchestrator.

10. The non-transitory computer-readable medium of claim 9, wherein the at least one service handler circuit comprises a pool of at least two processing circuits, further comprising conducting a load balancing to select one processing circuit from among the pool of processing circuits to which to forward the data service request.

11. The non-transitory computer-readable medium of claim 10, wherein the configuration information to include an Internet Protocol (IP) address for each of the processing circuits.

12. The non-transitory computer-readable medium of claim 9, wherein programming the at least one processor comprises programming the processor to listen for a transmission control protocol (TCP) packet arriving on port number 3868 and formatted according to a DIAMETER format.

13. The non-transitory computer-readable medium of claim 9, wherein programming the at least one processor comprises programming the processor to listen for a user datagram protocol (UDP) and formatted according to a RADIUS format.

14. A Service Routing Agent comprising:
at least one interface circuit coupled to exchange signals with an orchestrator, at least one processor, and at least one service handler circuit; and
at least one control circuit to:
obtain a configuration of the at least one service handler circuit and its associated application;
initialize a list of the at least one service handler circuit and its associated application;
program the at least one processor to listen for data service requests associated with the application;
obtain a data service request from the at least one processor;
classify the data service request according to the associated application;
monitor traffic statistics of the at least one processor, the traffic statistics including a traffic volume of the data service requests associated with the application;
in response to the traffic volume satisfying a threshold, activate at least one additional processing circuit to process the data service requests;
determine a priority level of the data service request based on a network load;
determine whether at least one service handler circuit associated with the application has been activated;
when the at least one service handler circuit has been activated, forward the data service request to the at least one service handler circuit based on the determined priority level of the data service request;
when the at least one service handler circuit has not been activated, the control circuit is to at least:
request that the at least one service handler circuit be activated, and then forward the data service request to the at least one service handler circuit;
identify at least a second service handler circuit that has been activated and forward the data service request to the second service handler circuit;
obtain a response to the data service request from the at least one service handler circuit;
forward the response to a requesting client; and
update and report the traffic statistics to the orchestrator.

15. The Service Routing Agent of claim 14, wherein the configuration to include an Internet Protocol (IP) address for each of the-service handler circuits.

16. The Service Routing Agent of claim 14, wherein the initializing the list of the at least one service handler circuit comprises receiving configuration data from the orchestrator.

17. The Service Routing Agent of claim 14, wherein programming the at least one processor comprises programming the processor to listen for at least one of a transmission control protocol (TCP) packet arriving on port number 3868 and formatted according to a DIAMETER format, and a stream control transmission protocol (SCTP) packet on port number 3868, and formatted according to the DIAMETER format.

18. The Service Routing Agent of claim 14, wherein programming the at least one processor comprises programming the processor to listen for a user datagram protocol (UDP) and formatted according to a RADIUS format.

* * * * *